(12) United States Patent
Tauchi et al.

(10) Patent No.: US 7,392,134 B2
(45) Date of Patent: Jun. 24, 2008

(54) SATELLITE NAVIGATION CONTROLLER

(75) Inventors: Nobutaka Tauchi, Toyoake (JP); Katsuhiko Mutoh, Toyota (JP); Hideki Tanino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/093,994

(22) Filed: Mar. 31, 2005

(65) Prior Publication Data

US 2005/0222768 A1 Oct. 6, 2005

(30) Foreign Application Priority Data

Apr. 5, 2004 (JP) .............................. 2004-111201

(51) Int. Cl.
*G01C 21/00* (2006.01)
*G01S 1/00* (2006.01)

(52) U.S. Cl. .................. 701/213; 701/200; 701/207; 701/214; 701/215; 701/216; 701/217; 342/357.02; 342/357.06; 342/357.12; 342/357.14; 342/357.15; 340/988; 340/995.1

(58) Field of Classification Search .................. 701/23, 701/207–211, 213–217, 1, 200; 340/988, 340/995.1; 342/357.06, 357.12–357.15, 342/357.02, 357.08
See application file for complete search history.

(56) References Cited

U.S. PATENT DOCUMENTS

| | | | | |
|---|---|---|---|---|
| 4,928,107 A | * | 5/1990 | Kuroda et al. | 342/357.15 |
| 5,416,712 A | * | 5/1995 | Geier et al. | 701/216 |
| 5,552,990 A | * | 9/1996 | Ihara et al. | 701/208 |
| 5,594,453 A | * | 1/1997 | Rodal et al. | 342/357.15 |
| 5,650,785 A | * | 7/1997 | Rodal | 342/357.12 |
| 5,757,646 A | * | 5/1998 | Talbot et al. | 701/215 |
| 5,781,156 A | * | 7/1998 | Krasner | 342/357.12 |
| 5,864,315 A | * | 1/1999 | Welles et al. | 342/357.12 |
| 5,995,042 A | * | 11/1999 | Durboraw et al. | 342/357.02 |

(Continued)

FOREIGN PATENT DOCUMENTS

JP U-59-154682 10/1984

(Continued)

OTHER PUBLICATIONS

Position estimation using GPS and dead reckoning; Aono, T.; Matsuda, Y.; Seino, K.; Kamiya, T.; Multisensor Fusion and Integration for Intelligent Systems, 1996. IEEE/SICE/RSJ International Conference on Dec. 8-11, 1996 pp. 533-540.*

*Primary Examiner*—Jack W. Keith
*Assistant Examiner*—Chuong P Nguyen
(74) *Attorney, Agent, or Firm*—Posz Law Group, PLC

(57) ABSTRACT

A navigation device changes a position determination accuracy of a receiver for satellite navigation to a higher accuracy in the following cases: when the subject vehicle approaches a destination, the subject vehicle runs on a road not described in map information, when the subject vehicle approaches an intersection at which the road is branched at a narrow angle within a predetermined distance, when the subject vehicle is running on a narrow street, when the subject vehicle is running on one of adjacent parallel roads, when self-contained sensors are calibrated, and other like occasions. In the other cases, the navigation device changes the position determination accuracy of the receiver to a low accuracy. When the receiver is caused to execute low-accuracy position determination, power supply to receiver's operation required only for high-accuracy position determination is prohibited.

17 Claims, 10 Drawing Sheets

U.S. PATENT DOCUMENTS

| | | | | |
|---|---|---|---|---|
| 6,016,121 A | * | 1/2000 | Bogensberger et al. | 342/357.12 |
| 6,133,871 A | * | 10/2000 | Krasner | 342/357.06 |
| 6,199,000 B1 | * | 3/2001 | Keller et al. | 701/50 |
| 6,384,774 B1 | * | 5/2002 | Mutoh et al. | 342/357.06 |
| 6,480,145 B1 | | 11/2002 | Hasegawa | 342/357.06 |
| 6,597,987 B1 | * | 7/2003 | Barton | 701/213 |
| 6,677,938 B1 | * | 1/2004 | Maynard | 345/419 |
| 6,727,850 B2 | * | 4/2004 | Park et al. | 342/357.15 |
| 6,784,834 B2 | * | 8/2004 | Sirola et al. | 342/357.15 |
| 6,812,887 B2 | * | 11/2004 | Syrjarinne et al. | 342/357.12 |
| 2003/0058163 A1 | * | 3/2003 | Zimmerman et al. | 342/357.08 |

FOREIGN PATENT DOCUMENTS

| | | |
|---|---|---|
| JP | A-09-126786 | 5/1997 |
| JP | A-2002-340589 | 11/2002 |
| JP | A-2002-340591 | 11/2002 |

* cited by examiner

FIG. 4A

NAVSTAR

| | CARRIER FREQUENCY [MHz] | CHIP RATE [Mcps] |
|---|---|---|
| L1-BAND | 1575.42 | 1.023 |
| L2-BAND | 1227.60 | 1.023 |
| L5-BAND | 1176.45 | 1.023 |

FIG. 4B

GALILERO

| | CARRIER FREQUENCY [MHz] | CHIP RATE [Mcps] |
|---|---|---|
| E5A,I,Q-BAND | 1176.45 | 10.23 |
| E5A,I,Q-BAND | 1207.14 | 10.23 |
| E6A-BAND | 1278.75 | 5.115 |
| E6B,C-BAND | 1278.75 | 5.115 |
| L1A-BAND | 1575.42 | M×1.023 |
| L1B,C-BAND | 1575.42 | 2.046 |

FIG. 4C

QUASI-ZENITH SATELLITE

| | CARRIER FREQUENCY [MHz] | CHIP RATE [Mcps] |
|---|---|---|
| L1-BAND | 1575.42 | 1.023 |
| L2-BAND | 1278.75 | 1.023 |
| L5-BAND | 1227.60 | 1.023 |

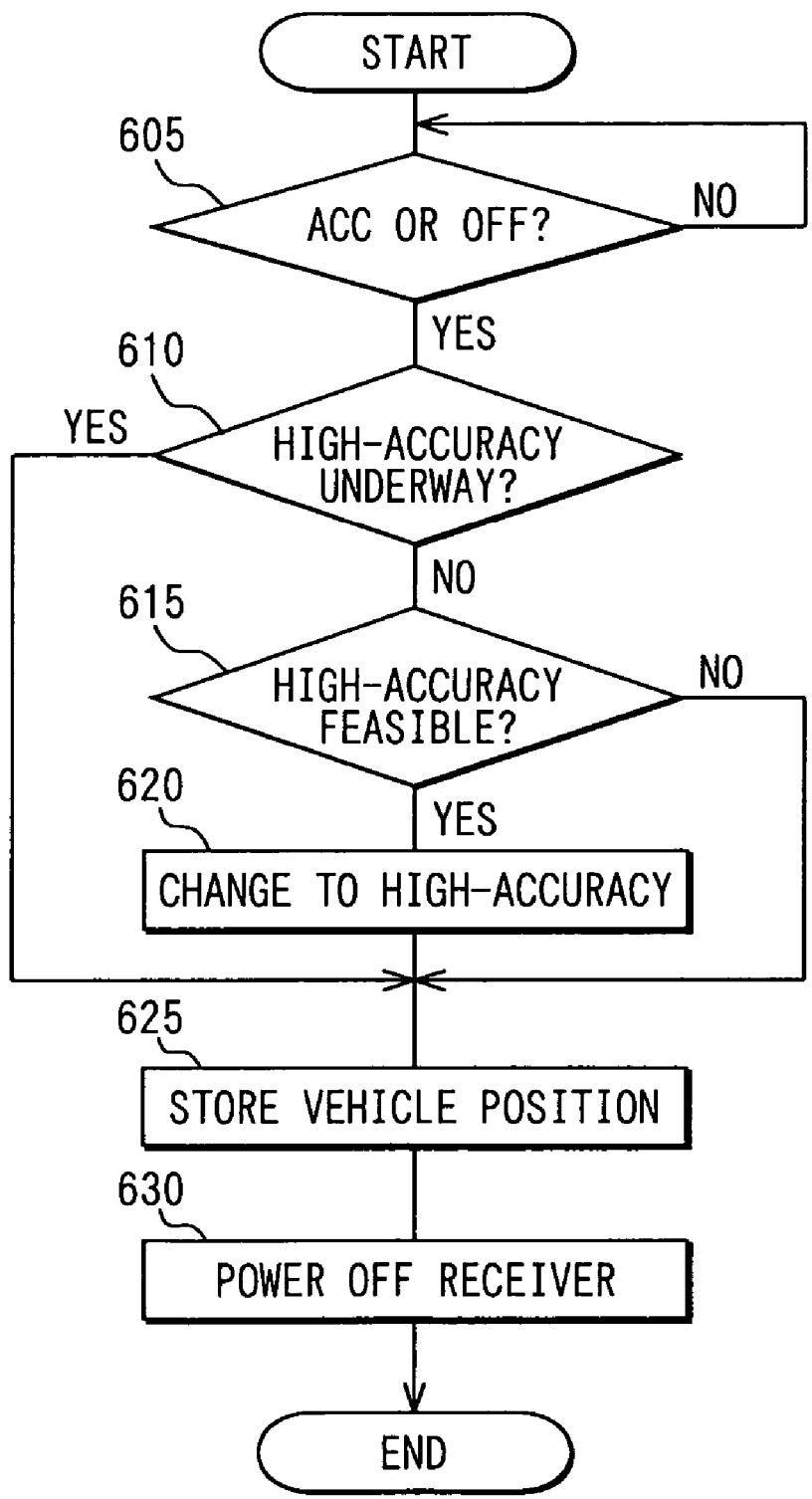

SATELLITE NAVIGATION CONTROLLER

CROSS REFERENCE TO RELATED APPLICATIONS

This application is based on and incorporates herein by reference Japanese Patent Application No. 2004-111201 filed on Apr. 5, 2004.

FIELD OF THE INVENTION

The present invention relates to a satellite navigation controller that causes a position determination device for satellite navigation to execute position determination with multiple accuracies based on signals from satellites for satellite navigation.

BACKGROUND OF THE INVENTION

One of conventionally known position determination methods is a method using GPS satellites possessed by the United States. This method using GPS is one of the satellite navigation methods. That is, based on signals received from multiple satellites whose positions are known, the distances between the self and the satellites are computed; and the present position of the self is computed from the computed distances and the positions of the satellites. Hereafter, satellites for satellite navigation are satellites for use in satellite navigation. A receiver for satellite navigation or a satellite navigatin receiver is a device that receives signals from satellites for satellite navigation and computes its own position. An antenna for satellite navigation or a satellite navigation antenna is an antenna for a receiver for satellite navigation to receive signals from satellites for satellite navigation.

In methods using GPS satellites, radio waves are received from three or more GPS satellites, and the distances from the individual satellites are computed. Then the present position is determined from the resultant distance data. The position determination accuracy of these methods is 10 to 30 m or so. To enhance the position determination accuracy, the following are considered: use of the GPS L2-band (1227.6 MHz) and L5-band (1176.45 MHz), launching of new satellites for satellite navigation, including Galileo and quasi-zenith satellites, introduction of RTK-GPS technology using an electronic reference point, and the like. As a result, there is a possibility that the position determination accuracy of 2 to 3 cm or less can be attained.

Use of the above-mentioned technologies makes it possible to provide a receiver for satellite navigation that can execute both the conventional position determination with low accuracy of 10 to 30 m or so and position determination with high accuracy of 2 to 3 cm or so. With such a receiver for satellite navigation, the results of position determination with multiple accuracies can be selectively used according to mode of utilization and usage.

After due consideration, however, the inventors concluded that position determination based on such satellite navigation involved a problem of increased power consumption.

An example will be taken. It will be assumed that signals whose chip rate is high are decoded (equivalent to de-spreading) to execute high-accuracy position determination. (Chip rate is defined as the amount of data per unit time of chips for spreading and de-spreading signals transmitted from satellites.) Constant decoding at a high chip rate in this case increases the processing load and the power consumption of equipment that decodes.

Further, it will be assumed that a receiver for satellite navigation is provided with reception circuits in multiple systems to execute position determination with multiple accuracies. Here, the reception systems are capable of receiving signals from satellites for satellite navigation of multiple frequencies. When the reception circuits in multiple systems are constantly operated regardless of whether they are required or not, power supply to unused reception circuits increases the power consumption.

SUMMARY OF THE INVENTION

The present invention has been made with the foregoing taken into account. It is an object of the present invention to suppress the power consumption in position determination in control of a receiver for satellite navigation that executes position determination with multiple accuracies based on signals from satellites for satellite navigation.

To achieve the above object, a satellite navigation controller is provided with the following. The satellite navigation controller controls a receiver for satellite navigation, wherein the receiver is able to execute position determination with a plurality of accuracies based on signals from satellites for satellite navigation. A determining unit is included for determining, of the pluratlity of accuracies, a given accuracy with which the receiver should be caused to execute position determination. A controlling unit is included for causing the receiver to execute position determination with the given accuracy and further prohibits decoding signals from the satellites for executing position determination with other accuracies excluding the given accuracy.

Under this structure, power consumption for position determination can be decreased as a whole.

BRIEF DESCRIPTION OF THE DRAWINGS

The above and other objects, features, and advantages of the present invention will become more apparent from the following detailed description made with reference to the accompanying drawings. In the drawings:

FIGS. 4A to 4C show tables illustrating the carrier frequency and chip rate of Navstar, Galileo, and quasi-zenith satellite;

FIG. 17 is a flowchart of a program executed by a control circuit to control the position determination accuracy of the receiver for satellite navigation when the subject vehicle is stopped and the ignition key for the vehicle is turned into the off or ACC position.

DETAILED DESCRIPTION OF THE PREFERRED EMBODIMENTS

Figure 1:
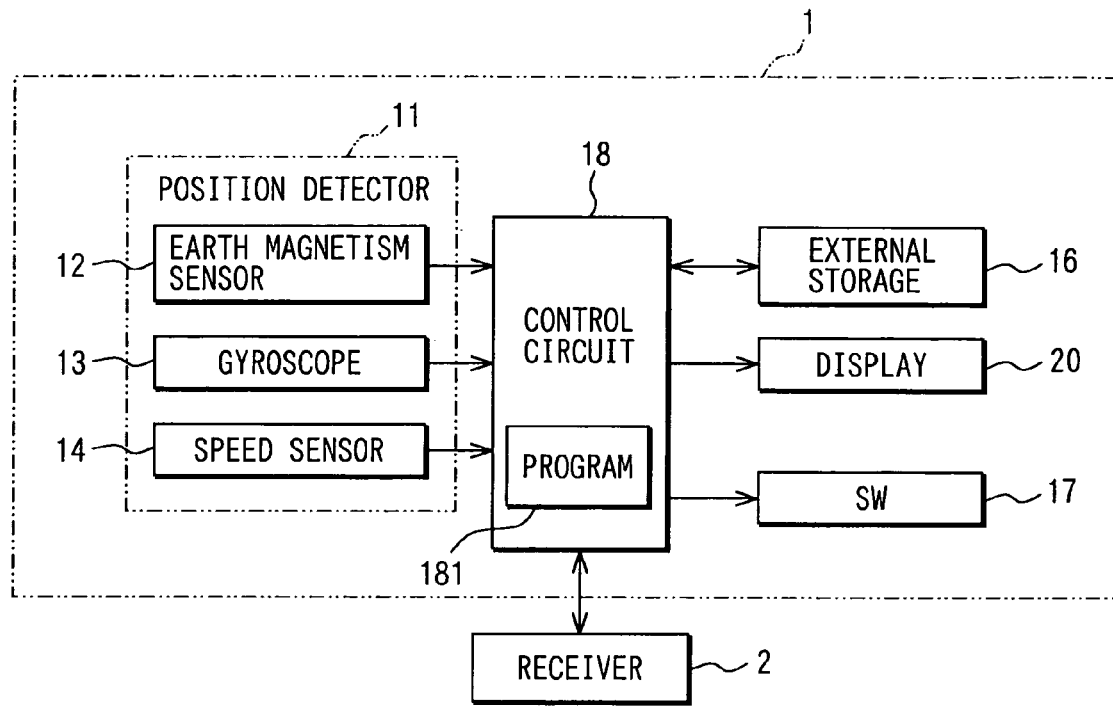
FIG. 1 is a drawing illustrating the configuration of a navigation device.

Hereafter, description will be given to a first embodiment of the present invention. FIG. 1 illustrates the configuration of a navigation device 1 mounted in a subject vehicle when used. The navigation device 1 includes a position detector 11, an external storage medium 16, an operation switch group 17, a control circuit 18, and a display unit 20.

The position detector 11 includes an earth magnetism sensor 12, a gyroscope 13, and a vehicle speed sensor 14 any of which is publicly known. These sensors and the like 12 to 14 output to the control circuit 18 information for identifying the present position based on their respective properties.

The external storage medium 16 includes a non-volatile storage medium such as HDD (Hard Disk Drive) onto which data can be additionally written and a device that controls the non-volatile storage medium. According to control instructions or the like from the control circuit 18, control is executed on the operation of reading data from the non-volatile storage medium and, when possible, the operation of writing data into the non-volatile storage medium. Information stored in the non-volatile storage medium includes data for so-called map matching for the enhancement of accuracy of the above-mentioned position detection, varied data including map information and landmark data, programs for the operation of the control circuit 18, and the like.

The control circuit 18 is constituted as an ordinary computer, and is provided therein with CPU, ROM, RAM, and flash memory. The control circuit 18 executes programs for the operation of the navigation device 1, read from the ROM or the external storage medium 16. During this execution, the control circuit 18 performs the following operations: it reads information from the ROM, RAM, or flash memory, and writes information into the RAM or the flash memory. The control circuit 18 communicates signals with the position detector 11, operation switch group 17, display unit 20, or the like. Further, it communicates signals with a receiver for satellite navigation 2.

When the navigation device 1 is started, the CPU of the control circuit 18 reads a boot program, OS (Operating System), and the like from the ROM and executes them, and controls the hardware and manages processes based on this OS. Examples of processes running on the OS include menu program, route search program, map display program, map generation program, various programs for controlling the position determination accuracy of the receiver 2, and the like.

In execution of these programs, the CPU of the control circuit 18 computes the present position when it is required to identify the present position. The computation of the present position is executed based on signals for identifying the present position, outputted from the sensors provided in the position detector 11, position information from the receiver 2 to be described later, and map matching. To compute the present position at this time, two methods are used together. One is self-contained (or autonomous) navigation in which the position of the subject vehicle is identified according to position information from the earth magnetism sensor 12, gyroscope 13, and vehicle speed sensor 14 and map matching. The other is a method in which the position of the subject vehicle is identified using position information from the receiver 2. The CPU of the control circuit 18 performs these position identification operations in parallel, and adds together the positions identified by these methods with either or both of them multiplied by a weight and takes the resultant value as the present position. For example, when position information from the receiver 2 is highly accurate, that is, it has a measurement error of approximately 10 cm or less, the present position is identified mainly using information from the receiver 2.

The computation of the present position by self-contained navigation is executed as follows: the present position is identified by computing how the position and orientation identified immediately before by self-contained navigation have been presently changed, from information of the speed, orientation, and the like of the vehicle obtained from the sensors 12 to 14. In the computation of the present position by self-contained navigation mentioned above, errors in information obtained from the sensors 12 to 14 are accumulated in the computed position as the number of times of present position computation increases. Based on the accumulated errors, the value of uncertainty of the position computed by self-contained navigation is increased. As described later, consequently, the CPU of the control circuit 18 carries out calibration to reduce the value of uncertainty.

The following description is based on the assumption that the operation performed by the CPU after the CPU reads a program is the operation performed by the program itself.

The menu program hierarchically displays the various programs that run on the OS in the form of menu by function and purpose, and causes the execution of a program, selected from the displayed menu by the user, to be started. Menu display is implemented by outputting the image data of the relevant menu to the display unit 20. The user's selection is detected based on signals inputted to the control circuit 18 through selecting operation with the operation switch group 17 (moving the cursor, pressing the confirm button, or the like).

A destination setting program is a program for setting a destination. This setting of a destination is implemented as follows: the program causes the display unit 20 to produce a display prompting the user to input a destination. Based on the input of a destination by the user using the operation switch group 17, the destination setting program stores the destination in the RAM of the control circuit 18.

The route search program automatically selects the optimum route from the present position to a destination set by the destination setting program, and displays the selected route on the display unit 20 as routing assistance. Known methods for automatically setting the optimum route include the Dijkstra method.

The map display program displays the following in superimposition on the screen of the display unit 20: the mark indicating the present position of the vehicle based on information of the identified present position, map information read using the external storage medium 16, and additional data of guided routes formed by the route search program, and the like.

Figure 2:
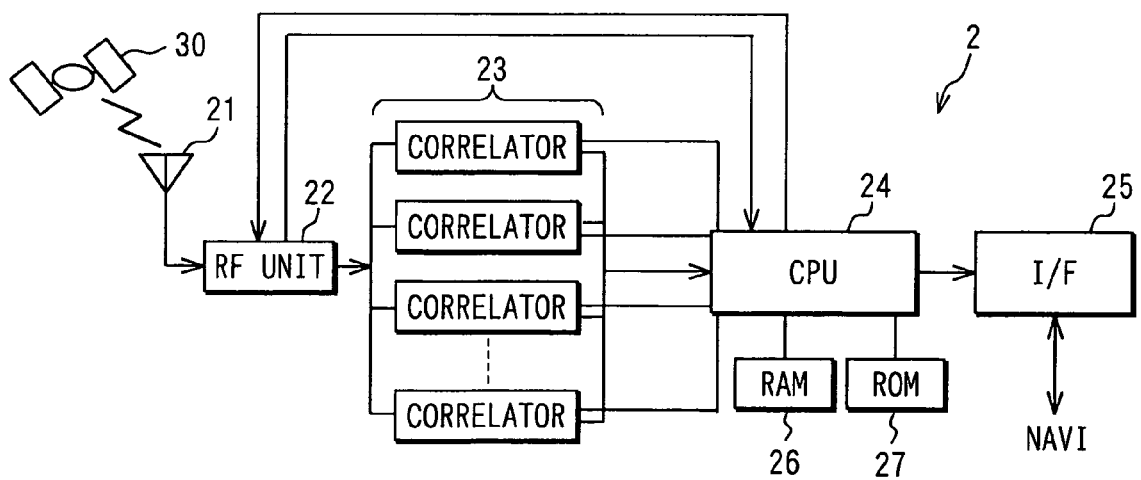
FIG. 2 is a drawing illustrating the configuration of a receiver for satellite navigation.

FIG. 2 illustrates the hardware configuration of the receiver 2. The receiver 2 includes an antenna for satellite navigation 21, an RF unit 22, a correlator unit 23, CPU 24, an interface circuit unit 25, RAM 26, and ROM 27.

The RF unit 22 subjects signals in the RF band received from multiple satellites 30 by the antenna 21 to varied processing including frequency conversion, amplification, and A/D conversion. The RF unit 22 outputs baseband signals obtained as the results of these processing to the correlator unit 23 and the CPU 24.

Figure 3:
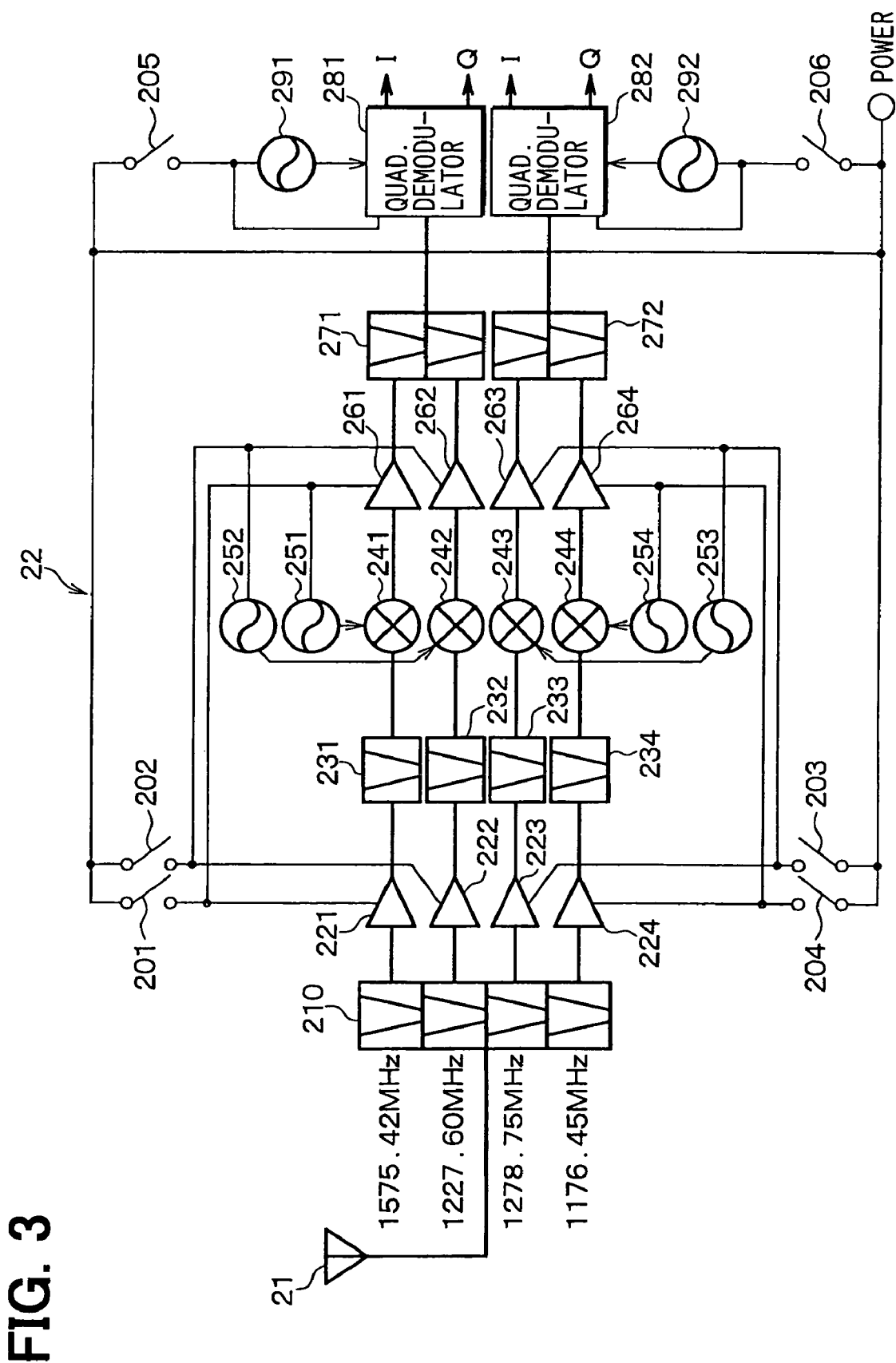
FIG. 3 is a drawing illustrating the configuration of an RF unit.

FIG. 3 illustrates the configuration of the RF unit 22 in detail. The RF unit 22 includes switches 201 to 206, a duplexer 210, low-noise amplifiers 221 to 224, high-frequency band-pass filters 231 to 234, mixers 241 to 244, local oscillators 251 to 254, IF-frequency band amplifiers 261 to 264, IF band-pass filters 271 and 272, quadrature demodulators 281 and 282, and local oscillators 291 and 292.

In this RF unit 22, first, the duplexer 210 branches signals received from satellites for satellite navigation 30 by the antenna 21, into signals in four bands: 1575.42 MHz band, 1227.60 MHz band, 1278.75 MHz band, and 1176.45 MHz band. Further, the RF unit 22 outputs these branched signals to the low-noise amplifier 221, low-noise amplifier 222, low-noise amplifier 223, and low-noise amplifier 224, respectively.

The low-noise amplifiers 221 to 224 amplify the inputted signals and output them to the high-frequency band-pass filters 231 to 234, respectively.

The high-frequency band-pass filters 231 to 234 remove unwanted frequency components from the inputted signals and output the resultant signals to the mixers 241 to 244, respectively.

The mixers 241 to 244 multiply the inputted signals by frequency signals from the local oscillators 251 to 254, respectively, and thereby down-convert the inputted signals into IF (Intermediate Frequency)-band signals. Then, the mixers 241 to 244 output the signals obtained as the result of down-conversion to the IF frequency band amplifier 261 to 264, respectively.

The IF frequency band amplifiers 261 and 262 amplify the inputted signals and output them to the IF band-pass filter 271, and the IF frequency band amplifiers 263 and 264 amplify the inputted signals and output them to the IF band-pass filter 272.

The IF band-pass filter 271 removes unwanted frequency components from the signals inputted from the IF frequency band amplifier 261 and the IF frequency band amplifier 262, and outputs the resultant signals to the quadrature demodulator 281. The IF band-pass filter 272 removes unwanted frequency components from the signals inputted from the IF frequency band amplifier 263 and the IF frequency band amplifier 264, and outputs the resultant signals to the quadrature demodulator 282.

Based on frequency signals from the local oscillator 291, the quadrature demodulator 281 subjects the signals from the IF band-pass filter 271 to quadrature demodulation and A/D conversion, and outputs I-signals and Q-signals as the baseband signals obtained as a result to the correlator unit 23. Based on frequency signals from the local oscillator 292, the quadrature demodulator 282 subjects the signals form the IF band-pass filter 272 to quadrature demodulation and A/D conversion, and outputs I-signals and Q-signals as the baseband signals obtained as a result to the correlator unit 23 and the CPU 24.

As mentioned above, signals received from the satellites 30 by the antenna 21 are subjected to frequency conversion, amplification, and the like with respect to each of the four frequency bands. Satellites for satellite navigation 30 whose signals are receivable or will be receivable in the future in these frequency bands include Navstar of the United States, Galileo of Europe, and quasi-zenith satellites of Japan. FIGS. 4A to 4C show tables listing the frequencies of carrier waves and the chip rates of spreading codes of Navstar, Galileo, and quasi-zenith satellite, respectively. In the tables in FIGS. 4A to 4C, the rows, excepting the heading rows, indicates sets of carrier frequency bands used and chip rates used in those frequency bands. The chip rate is defined as the speed of spreading code for subjecting signals from the satellites 30 to spreading modulation and de-spreading demodulation, that is, the number of chips (data unit) per unit time of spreading code.

More specific description will be given with reference to FIGS. 4A to 4C. In Navstar in FIG. 4A, transmission is executed in three bands: 1575.42 MHz band, 1227.60 MHz band, and 1176.45 MHz band. The chip rate in transmission is 1.023 Mcps in any band. In quasi-zenith satellite in FIG. 4C, transmission is executed in three bands: 1575.42 MHz band, 1278.75 MHz band, and 1227.60 MHz band. The chip rate in transmission is 1.023 Mcps in any band. In Galileo in FIG. 4B, signals are transmitted in the 1176.45 MHz band at a chip rate of 10.23 Mcps, for example.

The switches 201 to 206 switch between supply and non-supply of power to each part of the RF unit 22 under the on/off control of the CPU 24, described later.

More specific description will be given. When the switch 201 is on, the switch 201 supplies power from the power source to the low-noise amplifier 221, local oscillator 251, and IF frequency band amplifier 261. When the switch 201 is off, the switch 201 interrupts power supply. When the switch 202 is on, the switch 202 supplies power from the power source to the low-noise amplifier 222, local oscillator 252, and IF frequency band amplifier 262. When the switch 202 is off, the switch 202 interrupts power supply. When the switch 203 is on, the switch 203 supplies power from the power source to the low-noise amplifier 223, local oscillator 253, and IF frequency band amplifier 263. When the switch 203 is off, the switch 203 interrupts power supply. When the switch 204 is on, the switch 204 supplies power from the power source to the low-noise amplifier 224, local oscillator 254, and IF frequency band amplifier 264. When the switch 204 is off, the switch 204 interrupts power supply. When the switch 205 is on, the switch 205 supplies power from the power source to the local oscillator 291 and the quadrature demodulator 281. When the switch 205 is off, the switch 205 interrupts power supply. When the switch 206 is on, the switch 206 supplies power from the power source to the local oscillator 292 and the quadrature demodulator 282. When the switch 206 is off, the switch 206 interrupts power supply.

More specific description will be given. When the switch 201 is turned off, signals in the 1575.42 MHz band become unreceivable. When the switch 202 is turned off, signals in the 1227.60 MHz band become unreceivable. When the switch 203 is turned off, signals in the 1278.75 MHz band become unreceivable. When the switch 204 is turned off, signals in the 1176.45 MHz band become unreceivable. When the switch 205 is turned off, both signals in the 1575.42 MHz and signals in the 1227.60 MHz band become unreceivable. When the switch 206 is turned off, both signals in the 1278.75 MHz band and signals in the 1176.45 MHz band become unreceivable.

The correlator unit 23 has multiple correlators that perform correlation processing for synchronously acquiring and tracking satellites for satellite navigation. In response to signals received form the RF unit 22, these correlators output correlation values and the like by spreading code, different in phase, to the CPU 24 via a data bus in parallel. Each correlator multiplies signals outputted from one of multiple spreading code generators (not shown) by baseband signals received from the RF unit 22, and thereby outputs correlation values.

From which spreading code generator signals each correlator uses to output correlation values is determined according to control signals from the CPU 24. This is implemented, for example, by the CPU 24 controlling a switch that outputs one of the outputs from the multiple spreading code generators to a correlator.

The individual spreading code generators are capable of controlling supply and non-supply of power under the control of the CPU 24. The spreading codes outputted by the individual spreading code generators are spreading codes used for transmission in the above-mentioned satellites such as Navstar, quasi-zenith satellites, and Galileo.

The interface circuit unit 25 converts the format of signals received from the CPU 24 into that in accordance with the communication protocol of an in-vehicle LAN 6, and transmits the resultant signals to the navigation device 1 through the in-vehicle LAN 6. Further, the interface circuit unit 25 converts the format of signals received from the navigation device 1 through the in-vehicle LAN 6 into a format that can be processed by the CPU 24, and outputs the converted signals to the CPU 24. With this function, the CPU 24 can communicate signals with the navigation device 1 through the interface circuit unit 25.

The CPU 24 operates as follows: it reads programs from the ROM 27 and executes the programs, and processes data from the correlator unit 23 as required for the execution. The CPU 24 reads or writes information from or into the RAM 26 or the ROM 27. It communicates signals with the navigation device 1 through the interface circuit unit 25, and controls turn-on/off of the switches in the RF unit 22, to be described later.

More specific description will be given. When started, the CPU 24 synchronously acquires the satellites 30 based on correlation values from the correlator unit 23. After synchronous acquisition is established, the CPU 24 periodically measures the present position (latitude, longitude) of itself based on navigation messages contained in signals from the satellites 30. Then the CPU 24 outputs to the navigation device 1 through the interface circuit unit 25 position information including: the measured values, the accuracy of measurement, the number of satellites 30 whose signals are receivable, the state of reception (reception electric field strength and the degree of interference) from the satellites 30.

When the CPU 24 receives a measurement accuracy instruction from the navigation device 1 through the interface circuit unit 25 at this time, the CPU 24 tries measurement with the accuracy in accordance with the instruction. More specific description will be given. When the CPU 24 receives a measurement accuracy instruction to execute position determination with high accuracy, the CPU 24 controls turn-on/off of the switches 201 to 206 so that signals can be received form satellites for satellite navigation in two or more frequency bands (all the frequency bands when necessary). This is intended to receive signals from as many satellites as possible for high-accuracy position determination. For high-accuracy position determination, signals from the RF unit 22 are subjected to demodulation by de-spreading using not only a spreading code with a chip rate of 1.023 Mcps but also a spreading code with a higher chip rate of 5.115 Mcps, 10.23 Mcps, or the like.

When the CPU 24 receives a measurement accuracy instruction to execute position determination with low accuracy, the CPU 24 controls turn-on/off of the switches 201 to 206 so that signals will be received from satellites for satellite navigation in only one frequency band or the fewest possible frequency bands. More specifically, the CPU 24 controls turn-on/off of the switches 201 to 206 so that power supply for reception in frequency bands other than the above-mentioned frequency bands will be interrupted. Signals at a high chip rate from the RF unit 22 are not subjected to decoding by de-spreading, that is, decoding by de-spreading is prohibited.

The high-accuracy position determination described here refers to position determination with a measurement error of approximately 10 cm or less, and the low-accuracy position determination refers to position determination with a measurement error of several meters or more. An example of methods for implementing high-accuracy position determination is position determination using RTK (Real Time Kinematic positioning).

The receiver 2 has receiving devices (e.g. FM tuner, receiver for cellular communication) (not shown) for receiving reference data for RTK or D-GPS from reference stations that transmit the reference data. Position determination by the above-mentioned RTK or D-GPS is implemented by receiving the reference data through the receiving devices.

Figure 5:
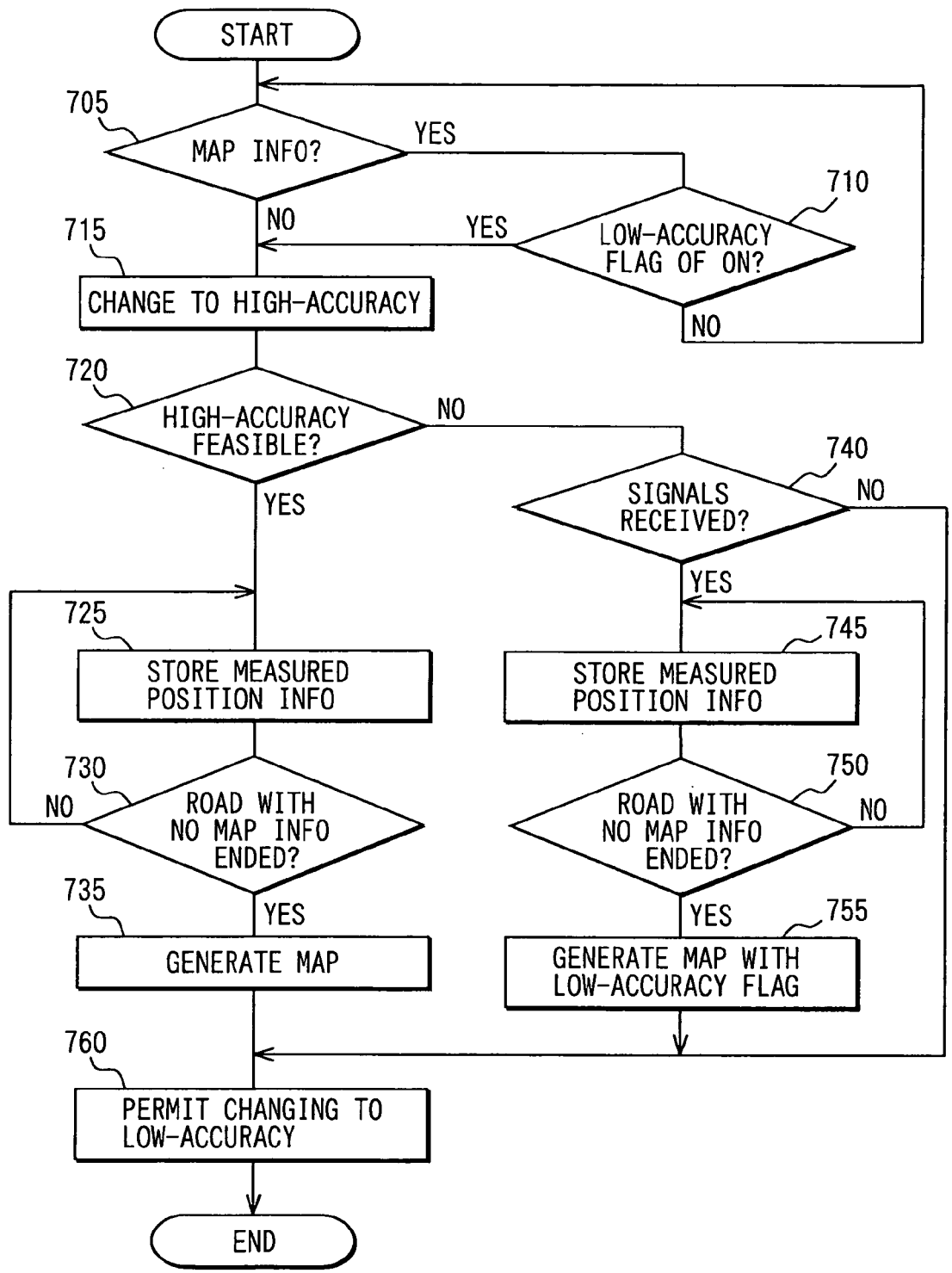
FIG. 5 is a flowchart of a map generation program.

Next, description will be given to the map generation program executed by the control circuit 18 of the navigation device 1. FIG. 5 is a flowchart of this map generation program. This program is repeatedly executed by the control circuit 18.

First, it is determined at Step 705 whether map information of the road on which the subject vehicle is presently running exists or not, that is, whether the subject vehicle is running on a road described in the map information in the external storage medium 16 or not. More specific description will be given. The present position of the subject vehicle is identified from information from the position detector 11 and the receiver 2, map matching, and the like. When this present position is not on any road in the map information, the map information of the road on which the subject vehicle is running is judged to be nonexistent. In the other cases, the map information of the road on which the subject vehicle is running is judged to be existent.

When the map information of the road on which the subject vehicle is running is judged to be existent, the operation proceeds to Step 710. When it is judged to be nonexistent, the operation proceeds to Step 715.

At Step 710, it is determined whether the road driven has the low-accuracy flag of on or not. Road driven refers to a road on which the subject vehicle is judged at Step 705 to be running. Low-accuracy flag is a flag given to each data of road segment (link) contained in map information. When the navigation device 1 is shipped from factory, the low-accuracy flags given to the road segments are all provided with a value indicating off. As described later, the low-accuracy flag being on means that the low-accuracy flag has a value indicating that the data of road segments newly added to map information is generated based on low-accuracy position information. When the road driven has the low-accuracy flag of on, the processing of Step 715 is subsequently performed. When the road driven has the low-accuracy flag of off, the processing of Step 705 is subsequently performed.

When the above-mentioned processing of Steps 705 and 710 reveals that the map information of the road on which the subject vehicle is running is nonexistent or the subject vehicle is running on a road whose low-accuracy flag is on, the processing of Step 715 is subsequently performed. At Step 715, control is executed to change the position determination accuracy of the receiver 2 to high accuracy. More specifically, a measurement accuracy instruction to execute high-accuracy position determination is outputted to the receiver 2, and further a first permission flag in a predetermined area in the RAM included in the control circuit 18 is turned off. In addition to the area for the first permission flag, areas for second, third, fourth, and fifth permission flags are in the RAM. The control circuit 18 executes a control program 181 different from the map generation program (Refer to FIG. 1.), and thereby constantly monitors the individual permission flags. When the values of all the first to fifth permission flags become on, the control circuit 18 outputs a measurement accuracy instruction to execute low-accuracy position determination to the receiver 2 to change the position determination accuracy of the receiver 2 to low accuracy. When the value of any one of the first to fifth permission flags becomes off, the control circuit 18 outputs a measurement accuracy instruction to execute high-accuracy position determination to the receiver 2 to change the position determination accuracy of the receiver 2 to high accuracy.

Subsequently, it is determined at Step 720 whether high-accuracy position determination is feasible or not. That is, it is determined whether the receiver 2 is being capable of executing high-accuracy position determination as controlled or not. Specifically, whether the receiver 2 is being capable of executing high-accuracy position determination is determined based on the information of measurement accuracy outputted from the receiver 2. When high-accuracy position determination is feasible, the processing of Step 725 is subsequently performed. When high-accuracy position determination is unfeasible, the processing of Step 740 is subsequently performed.

At Step 725, the position information obtained as the result of the measurement by the receiver 2 is stored into the external storage medium 16.

Subsequently, it is determined at Step 730 whether running on the road whose map information is nonexistent has been terminated or not. Specifically, the same judgment processing as of Step 705 is performed. When the map information of the road on which the subject vehicle is presently running exists, running on the road whose map information is nonexistent is judged to have been terminated. In the other cases, running on the road whose map information is nonexistent is judged to have not been terminated yet. When running on the road whose map information is nonexistent has been terminated, the processing of Step 735 is subsequently performed. When running on the road whose map information is nonexistent is judged to have not been terminated yet, the processing of Step 725 is subsequently performed.

Figure 6:
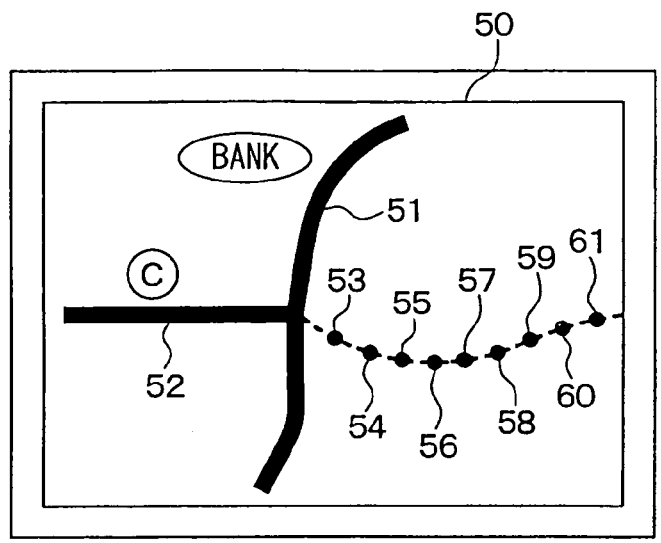
FIG. 6 is a drawing illustrating stored position information in the map generating program.

As long as the subject vehicle is running on a road whose map information is nonexistent, position information outputted from the receiver 2 continues to be stored through the above-mentioned processing of Steps 725 and 730. FIG. 6 illustrates a map 50 for illustrating position information stored at Step 725. The map information in the external storage medium 16 contains the data of road segments, Road 51 and Road 52, in the area embraced in the map 50. When the vehicle mounted with the navigation device 1 continuously runs by Points 53 to 61, it runs on a road whose information is not contained in map information. As a result, the processing of Step 725 is repeated, and the position information of Points 53 to 61 is thereby stored into the external storage medium 16.

Figure 7:
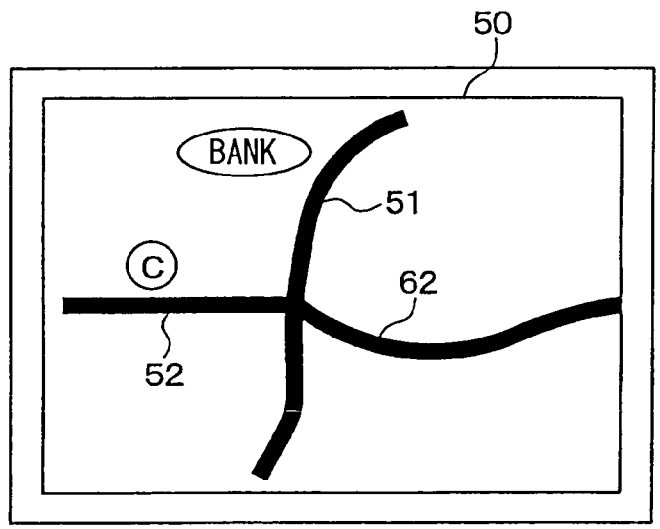
FIG. 7 is a drawing illustrating data of added road segments in the map generating program.

At Step 735, the data of the road segment is generated based on the position information stored at Step 725, and it is added to map information. FIG. 7 shows a map 50 that illustrates the added data of the road segment. When the position information of Points 53 to 61 in FIG. 6 is stored at Step 725, a line smoothly connecting these points is stored as the road segment data of a new road 62. The low-accuracy flag given to this data of road segment is set to off. This is because the generated data of road segment is based on the data obtained as the result of position determination executed by the receiver 2 with high accuracy.

Subsequently, it is permitted at Step 760 to change the position determination accuracy of the receiver 2 to low accuracy. Specifically, the above-mentioned first permission flag is set to on. After Step 760, the execution of the map generation program is terminated.

When high-accuracy position determination is judged to be unfeasible at Step 720, it is determined at Step 740 whether the receiver for satellite navigation can receive signals from satellites or not. This determination is made based on whether the accuracy of position determination outputted from the receiver 2 is very high or not. When the receiver 2 is judged to be capable of receiving signals from satellites, the processing of Step 745 is subsequently performed. When the receiver 2 cannot receive signals from any satellite, the processing of Step 760 is subsequently performed.

The processing of Step 745 and the processing of Step 750 are the same as the processing of Step 725 and the processing of Step 730, respectively.

Figure 8:
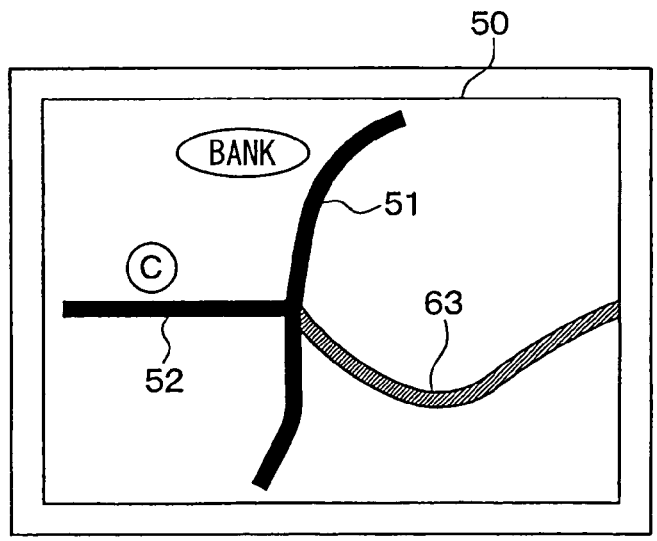
FIG. 8 is a drawing illustrating data of added road segments in the map generating program.

The processing of Step 755 is the same as the processing of Step 735. At Step 755, however, the low-accuracy flag given to the data of road segment is set to on. This is because the generated data of road segment is based on the data obtained as the result of position determination executed by the receiver 2 with low accuracy. FIG. 8 shows a map 50 that illustrates the data of road segment added in this case. When the position information of Points 53 to 61 in FIG. 6 is stored at Step 755, a line smoothly connecting these points is stored as the road segment data of a new road 63. The newly added data of road segment of Road 63 has the low-accuracy flag whose value is on. The above-mentioned map display program may be constituted so that the following occurs: when the map embracing the area of the map 50 is displayed on the display unit 20, the map display program varies the display mode, including the color, shade, pattern, and thickness of the display, based on the low-accuracy flag of the data of road segment. Following Step 755, the processing of Step 760 is performed.

By executing the above-mentioned map generation program, the control circuit 18 changes the accuracy of the receiver 2 to high in the following cases (Step 720): when the subject vehicle runs by a point on a road whose information is not contained in the map information in the external storage medium 16 (Steps 705, 730, and 750), and when the subject vehicle runs on a road segment whose data is generated based on low-accuracy position information (Step 710).

When the receiver 2 is outputting high-accuracy position information (Step 720), the information of the new road segment is added to map information based on that position information (Step 735). When the receiver 2 is outputting low-accuracy position information (Steps 720 and 740), the information of the new road segment is added to map information based on that position information. At this time, the low-accuracy flag of on indicating that that information is based on low-accuracy position information is added together to map information (Step 755).

Then the control circuit 18 permits the receiver for satellite navigation to execute position determination with low accuracy (Step 760) in the following case: when the subject vehicle does not run by a point on a road whose information is not contained in the map information in the external storage medium 16 (Steps 705, 730, and 750), and at the same time, the subject vehicle does not run on a road segment whose data is generated based on low-accuracy position information (Step 710).

Figure 9:
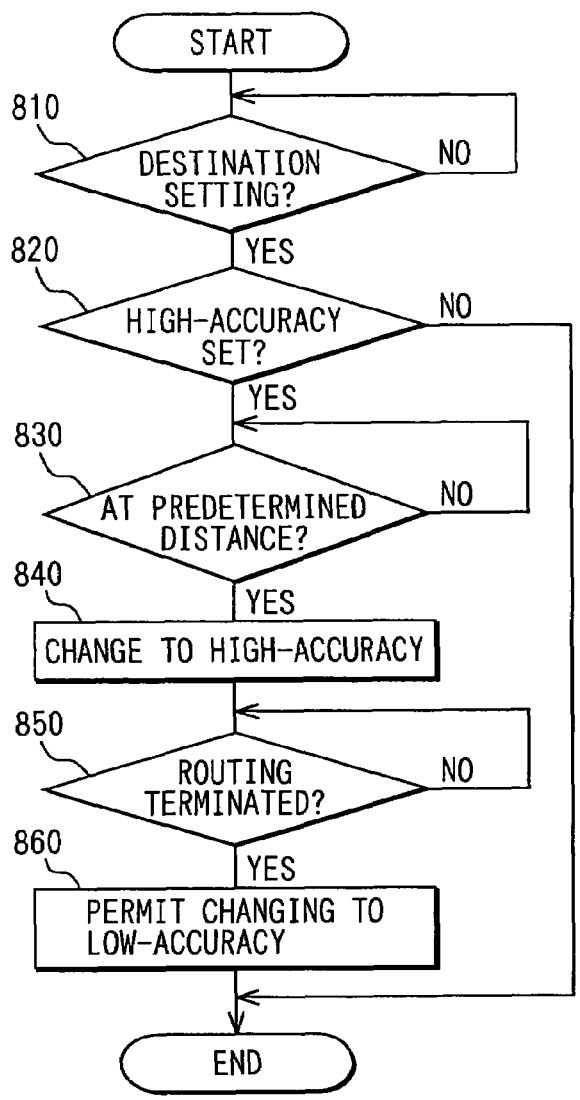
FIG. 9 is a flowchart of a program executed to control the position determination accuracy of the receiver for satellite navigation when the subject vehicle has come close to a preset destination.
Figure 10:
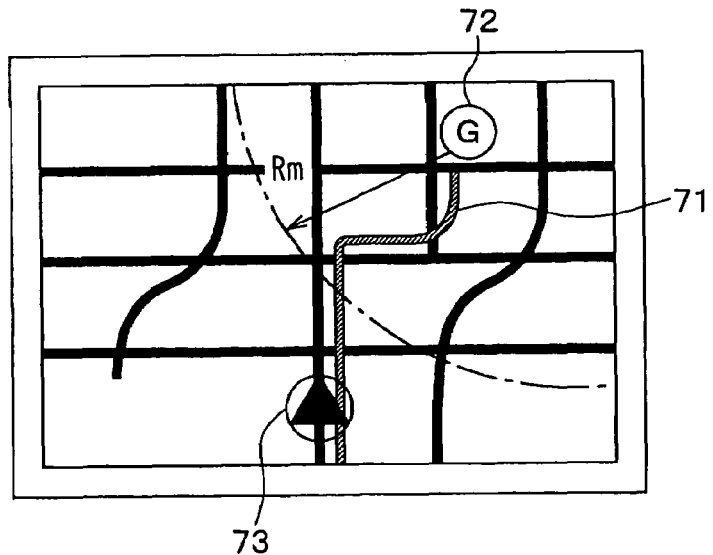
FIG. 10 is a drawing illustrating a case where the subject vehicle is coming close to a destination.

Next, description will be given to a program executed to control the position determination accuracy of the receiver 2 when the subject vehicle has approached a preset destination. FIG. 9 is a flowchart of this program, and FIG. 10 shows a map that illustrates a case where the subject vehicle approaches the destination. It will be assumed that the subject vehicle 73 is running on a guided route 71, computed by the route search program, leading to the destination 72 set by the above-mentioned destination setting program. The subject vehicle is coming close to an area at a predetermined distance from the destination 72 (for example, within a radius of R km). When the position of the subject vehicle can be identified with high accuracy at this time, it can be learned with accuracy whether the subject vehicle has arrived at the destination 72 such as a small shop or house.

The program in FIG. 9 is repeatedly executed. First, it is determined at Step 810 whether a destination has been set and routing assistance is being provided. Specifically, it is determined whether a destination has been set by the destination setting program and whether the map display program is presently displaying a guided route to the destination. When a destination has been set and routing assistance is being provided, the processing of Step 820 is subsequently performed. When it has not been set, the processing of Step 810 is repeated.

It is determined at Step 820 whether high-accuracy position determination and guidance in proximity to destination has been set or not. The value of a flag for high-accuracy position determination and guidance in proximity to destination is ensured in a predetermined area in the external storage medium 16. That high-accuracy position determination and guidance in proximity to destination has been set means that the value of the flag is on. This flag is user-settable. Specifically, this flag is so constituted that the value of the flag is switched between on and off when the user operates the operation switch group 17 for changing the flag setting. When high-accuracy position determination and guidance in proximity to destination has been set, the processing of Step 830 is subsequently performed. When it has not been set, the execution of this program is terminated.

It is determined at Step 830 whether the present position has come close to an area at a predetermined distance from the preset destination or not. Specifically, the following operation is performed: the linear distance between the present position, identified using the position detector 11, the receiver 2, map matching, and the like, and the preset destination is computed. Then it is determined whether the computed distance is not longer than the predetermined distance (e.g. 2 km). When the computed distance has gotten close to the predetermined distance, the processing of Step 840 is subsequently performed, and otherwise, the processing of Step 830 is repeated.

At Step 840, the position determination accuracy of the receiver 2 is changed to high accuracy. Specifically, the following operation is performed: a measurement accuracy instruction to execute high-accuracy position determination is outputted to the receiver 2. Further, a second permission flag ensured in a predetermined area in the RAM is set to off.

Subsequently, it is determined at Step 850 whether routing assistance has been terminated or not. Specifically, it is determined whether the present position has entered a range (for example, within 20 m from the destination) where the subject vehicle can be said to have arrived at the destination or not. When position information obtained as the result of high-accuracy position determination is outputted from the receiver 2, this determination can be made with accuracy. This processing is repeated until routing assistance is terminated. When routing assistance is terminated, the processing of Step 860 is subsequently performed.

At Step 860, it is permitted to change the accuracy of the receiver 2 to low. Specifically, the above-mentioned second permission flag is set to on. After Step 860, the execution of the map generation program is terminated.

By executing the above-mentioned program, the control circuit 18 causes the receiver 2 to execute position determination with high accuracy in the following case: when with respect to the routes to the destination, routing assistance is being provided (Step 810), and high-accuracy position determination and guidance in proximity to destination has been set (Step 820), and the present position has gotten close to the preset destination within a preset distance (Step 830). This high-accuracy position determination is executed for the following purposes: to compute the positional relation between the destination and the subject vehicle to determine whether the subject vehicle has arrived at the destination, or to display the positional relation between the destination and the subject vehicle on a map with accuracy.

Figure 11:
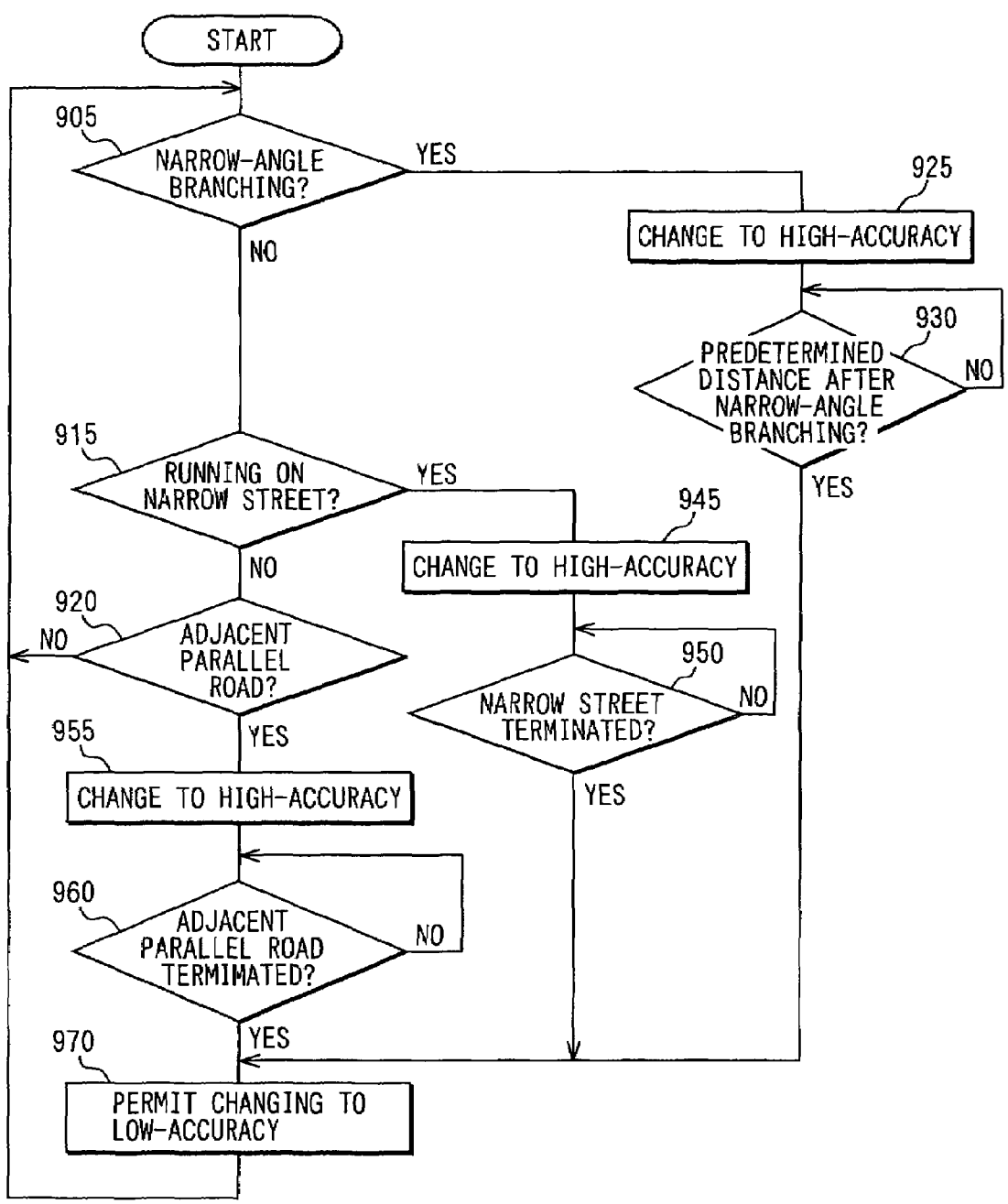
FIG. 11 is a flowchart of a program executed to control the position determination accuracy of the receiver for satellite navigation when the vehicle approaches an intersection at which the road is branched at a narrow angle, the vehicle runs on a narrow street, or the vehicle runs on one of adjacent parallel roads.
Figure 12:
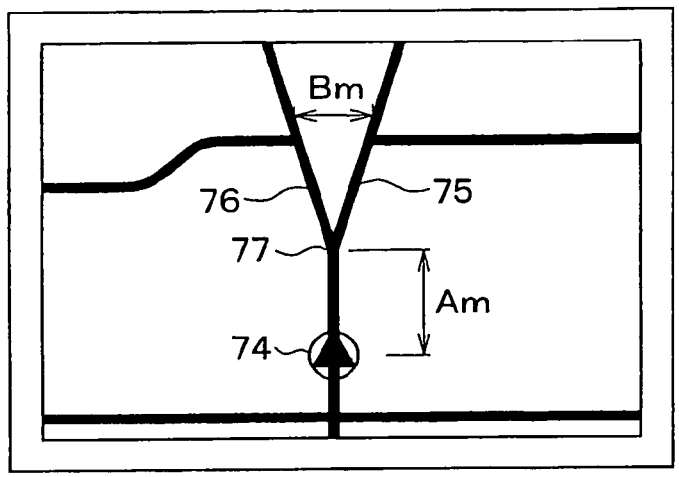
FIG. 12 is a drawing illustrating a case where the vehicle approaches an intersection at which the road is branched at a narrow angle.
Figure 13:
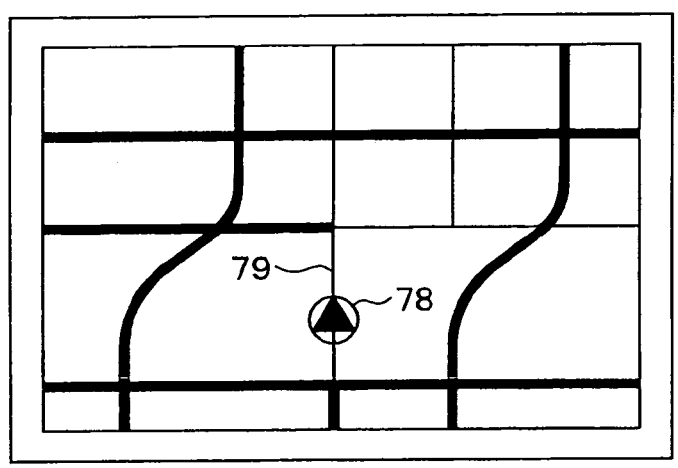
FIG. 13 is a drawing illustrating a case where the vehicle runs on a narrow street.
Figure 14:
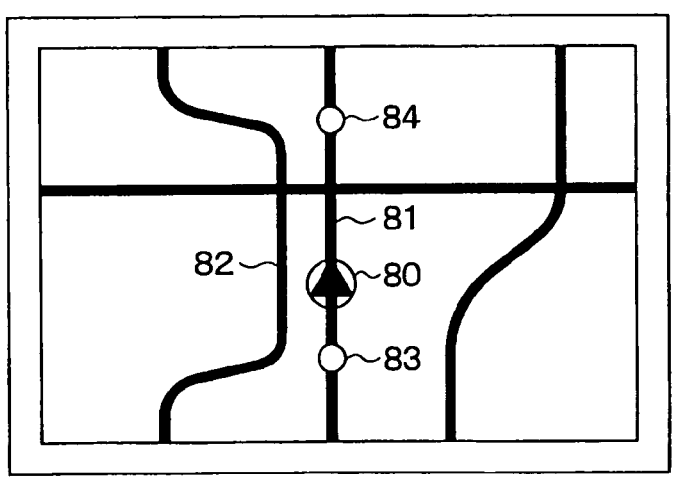
FIG. 14 is a drawing illustrating a case where the vehicle runs on one of adjacent parallel roads.

Next, description will be given to a program executed to control the position determination accuracy of the receiver 2 in the following cases: when the subject vehicle approaches an intersection at which the road is branched at a narrow angle, when the subject vehicle runs on a narrow street, or when the subject vehicle runs on one of adjacent parallel roads. FIG. 11 is a flowchart of this program, and FIG. 12, FIG. 13, and FIG. 14 show maps that respectively describe the following cases: a case where the subject vehicle approaches an intersection at which the road is branched at a narrow angle, a case where the subject vehicle runs on a narrow street, and a case where the subject vehicle runs on one of adjacent parallel roads.

This program is executed after the navigation device 1 is started. First, it is determined at Step 905 whether a narrow-angle branching intersection exists within a predetermine distance (e.g. within 100 m) or not. The narrow-angle branching intersection is defined as an intersection that meets the following conditions: two roads (equivalent to Road 75 and Road 76 in FIG. 12) branching at the intersection exist, and the two roads branching at the intersection are close to each other with a second predetermined distance (B m in FIG. 12) or less in-between even in a place distant from the intersection by a first predetermined distance, like Intersection 77 in FIG. 12. In FIG. 12, the vehicle 74 is approaching a point at a distance A m from the narrow-angle branching intersection 77.

Here, the first predetermined distance is sufficiently greater than the second predetermined distance. For example, the first predetermined distance may be set to 200 m, and the second predetermined distance may be set to 30 m. Whether an intersection is a narrow-angle branching intersection is determined based on the following: the position of the intersection (node) described in the map information in the external storage medium 16, the positions of the end points of road segments connecting to the intersection, and the shape of these road segments. When the subject vehicle has gotten into an area at the predetermined distance from the narrow-angle branching intersection, the processing of Step 925 is subsequently performed, and otherwise, the processing of Step 915 is subsequently performed.

At Step 925, control is executed to change the position determination accuracy of the receiver 2 to high accuracy. Specifically, a measurement accuracy instruction to execute high-accuracy position determination is outputted to the receiver 2. Further, a third permission flag ensured in a predetermined area in the RAM is set to off.

Subsequently, it is determined at Step 930 whether the subject vehicle has passed through the narrow-angle branching intersection and has run a predetermined distance. That is, it is determined whether the subject vehicle has gone away by a predetermined distance or more from the narrow-angle branching intersection judged at Step 905 to exist within the predetermined distance. When the subject vehicle has not run by the predetermined distance, the processing of Step 930 is repeated. When the subject vehicle has run by the predetermined distance, the processing of Step 970 is subsequently performed.

At Step 970, it is permitted to change the accuracy of the receiver 2 to low. Specifically, the above-mentioned third permission flag is set to on. After Step 970, the processing of Step 905 is performed.

At Step 915, it is determined whether the road on which the subject vehicle is running is a narrow street or not. Whether a road segment is a narrow street may be determined by determining whether the width of the street is less than a predetermined value (e.g. 6 m) based on the information of the width of the road segment in the map information in the external storage medium 16. In FIG. 13, roads are indicated by thick line, and narrow streets are indicated by thin line. In the figure, the vehicle 78 is running on a narrow street 79. Such narrow streets often have other narrow streets existing in proximity to thereto. Therefore, when the present position can be identified with high accuracy, the above-mentioned map display program can display the positional relation between the subject vehicle on the narrow street and the narrow street with accuracy. When the road on which the subject vehicle is running is a narrow street, the processing of Step 945 is subsequently performed. When the road is not a narrow street, the processing of Step 920 is subsequently performed.

The processing of Step 945 is the same as the processing of Step 925. At Step 945, control is executed to change the position determination accuracy of the receiver for satellite navigation to high accuracy.

Subsequently, it is determined at Step 950 whether running on the narrow street has been terminated, that is, whether the subject vehicle has come to no longer run on the narrow street. When running on the narrow street has been terminated, the processing of Step 970 is subsequently performed. When it has not been terminated, the processing of Step 950 is repeated.

At Step 920, it is determined whether the road on which the subject vehicle is running has an adjacent parallel road or not. Specifically, it is determined from the map information in the external storage medium 16 whether there is a road segment in proximity to and in parallel with the road segment on which the subject vehicle is running. Proximity described here refers to adjacency within a predetermined distance (e.g. within 30 m). Parallel means that the angle formed by the road segment on which the subject vehicle is running and the adjacent road segment is a predetermined value (e.g. 30°) or less.

In FIG. 14, the road 81 on which the vehicle 80 is running has an adjacent parallel road 82. In this figure, the range where the road 81 has the adjacent parallel road is from Point 83 to Point 84. When the vehicle is running on one of adjacent parallel roads, the following advantages are brought when the present position can be identified with high accuracy: the above-mentioned map display program can display the positional relation between the subject vehicle and the road driven with accuracy; and the possibility that the subject vehicle is judged to be on a wrong road by map matching is reduced. When an adjacent parallel road is judged to exist, the processing of Step 955 is subsequently performed. When an adjacent parallel road is judged to be nonexistent, the processing of Step 905 is subsequently performed.

The processing of Step 955 is the same as the processing of Step 925 and Step 945. At Step 955, control is executed to change the position determination accuracy of the receiver 2 to high accuracy.

Subsequently, it is determined at Step 960 whether the adjacent parallel road has become nonexistent or not. That is, it is determined whether the road on which the subject vehicle is presently running no longer has an adjacent parallel road. When the adjacent parallel road has become nonexistent, the processing of Step 970 is subsequently performed. When an adjacent parallel road exists, the processing of Step 960 is repeated.

By executing the above-mentioned program, the control circuit 18 operates as follows. The control circuit 18 changes the position determination accuracy of the receiver 2 to high accuracy in the following cases: when an intersection at which the road is branched at a narrow angle exists within a predetermined distance, when the subject vehicle is running on a narrow street, and when the subject vehicle is running on one of adjacent parallel roads. In the other cases, the control circuit 18 permits the receiver 2 to execute position determination with low accuracy.

When the subject vehicle approaches an intersection at which the road is branched at a narrow angle, runs on a narrow street, or runs on one of adjacent parallel roads and the receiver 2 is caused to execute position determination with high accuracy, the following measure may be taken: the maximum extraction range for map matching is made narrower as compared with the other cases (hereafter, referred to as "ordinary cases.")

The maximum extraction range for map matching refers to a reference range used when the position of the subject vehicle identified using the receiver 2 or self-contained sensors deviates from the position on the road on map data. The reference range is for determining to what extent from the identified position of the subject vehicle the position should be corrected by map matching. For roads existing within the above-mentioned maximum extraction range from the position of the subject vehicle identified using the receiver 2 or self-contained sensors, position correction by map matching is permitted. For roads existing out of the maximum extraction range, position correction by map matching is prohibited.

A specific example of change of the maximum extraction range for map matching will be taken. In ordinary cases, the control circuit 18 defines the maximum extraction range as a range within a 15-m radius of the position of the subject vehicle identified using the receiver 2 or self-contained sensors. To narrow the above-mentioned maximum extraction range for map matching, the control circuit 18 defines the maximum extraction range as a range within a 5-m radius of the position of the subject vehicle identified using the receiver 2 or self-contained sensors. Thus, the possibility that the subject vehicle is judged to be on a wrong road by map matching can be reduced.

Figure 15:
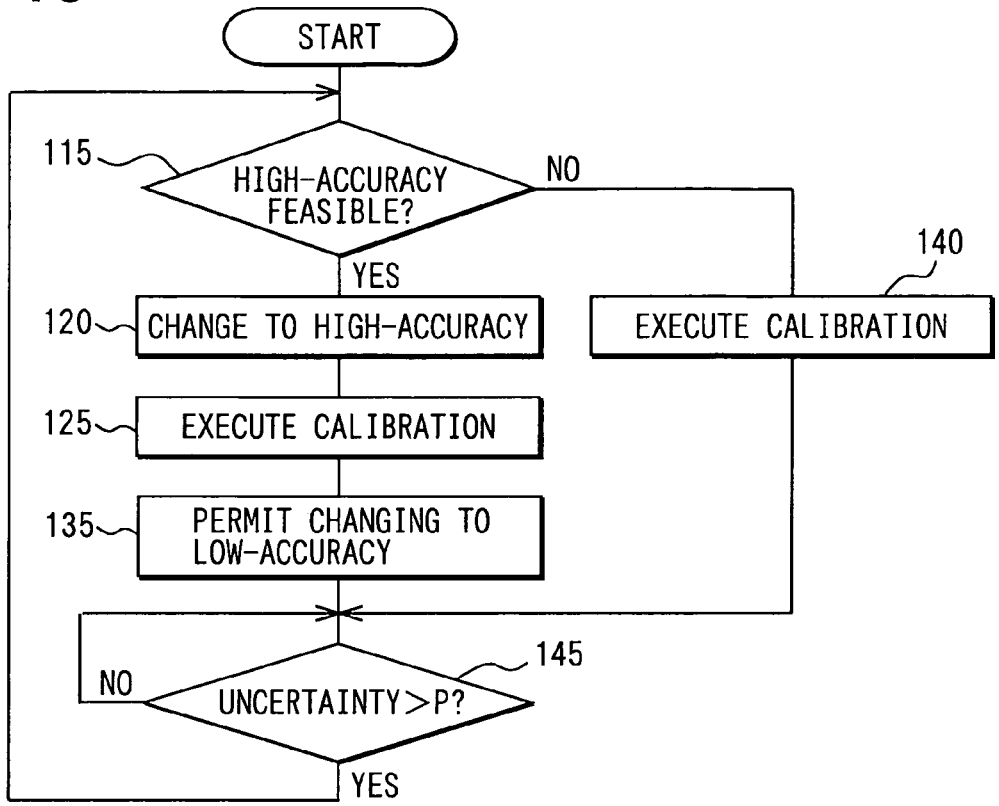
FIG. 15 is a flowchart of a program executed to control the position determination accuracy of the receiver for satellite navigation when the computed position in self-contained navigation is calibrated.

Next, description will be given to a program executed to control the position determination accuracy of the receiver 2 when the computed position in self-contained navigation is calibrated. FIG. 15 is a flowchart of this program. The execution of this program is started immediately after the ignition key for the vehicle is turned into the on or ACC position and the navigation device 1 is started.

First, it is determined at Step 115 whether high-accuracy position determination is feasible or not. This determination is made based on the number of satellites for satellite navigation from which signals can be received, contained in position information received from the receiver 2, the state of reception of reference information from reference stations. When high-accuracy position determination is feasible, the processing of Step 120 is subsequently performed. When high-accuracy position determination is unfeasible, the processing of Step 140 is subsequently performed.

At Step 120, the position determination accuracy of the receiver 2 is changed to high accuracy. Specifically, a measurement accuracy instruction to execute high-accuracy position determination is outputted to the receiver 2. Further, a fourth permission flag ensured in a predetermined area in the RAM is set to off.

Subsequently, calibration is executed at Step 125. Specifically, the present position identified by self-contained navigation is changed to the present position based on position information from the receiver 2. The value of uncertainty of the position computed by self-contained navigation is zeroed.

Subsequently, control is executed at Step 135 to change the position determination accuracy of the receiver 2 to low accuracy. Specifically, the above-mentioned fourth permission flag is set to on.

Subsequently, it is determined at Step 145 whether the value of uncertainty of the position computed by self-contained navigation is greater than a predetermined value P (e.g. 30 m). When the error is greater than the predetermined value P, the processing of Step 115 is subsequently performed. When the error is less than the predetermined value P, the processing of Step 145 is repeated.

When high-accuracy position determination is unfeasible, calibration is executed at Step 140 as at Step 125. After Step 140, the processing of Step 145 is subsequently performed.

By executing the above-mentioned program, the control circuit 18 causes the receiver 2 to execute high-accuracy position determination (Step 120) to execute calibration immediately thereafter (Step 125). Thus, calibration is executed using high-accuracy position information from the receiver 2, and thereby the accuracy of calibration is enhanced. Therefore, the frequency with which calibration is repeatedly executed can be reduced. However, when the receiver 2 cannot execute high-accuracy position determination, calibration is executed with the position determination accuracy of the receiver 2 kept low (Step 115, Step 140).

Next, description will be given to a program executed by the control circuit 18 to control the position determination accuracy of the receiver 2 when the subject vehicle is stopped and the ignition key for the vehicle is turned into the off or ACC position. FIG. 17 is a flowchart of this program. The control circuit 18 starts the execution of this program when the navigation device 1 is started.

First, it is determined at Step 605 whether the key switch for the vehicle is in either or neither of the off position and the ACC position. This determination is made based on signals from an ignition line (not shown) connected to the control circuit 18. When the key switch for the vehicle is in either the off position or the ACC position, the processing of Step 610 is subsequently performed. In the other cases, the processing of Step 605 is repeated.

At Step 610, it is determined whether the receiver 2 is executing high-accuracy position determination or not. When the receiver 2 is executing high-accuracy position determination, the processing of Step 625 is subsequently performed. When the receiver 2 is not executing high-accuracy position determination, the processing of Step 615 is subsequently performed.

At Step 615, it is determined by the same method as of Step 115 in FIG. 15 whether high-accuracy position determination is feasible or not. When high-accuracy position determination is feasible, the processing of Step 620 is subsequently performed. When high-accuracy position determination is unfeasible, the processing of Step 625 is subsequently performed.

At Step 620, the position determination accuracy of the receiver 2 is changed to high accuracy by the same method as of Step 120 in FIG. 15. Following Step 620, the processing of Step 625 is performed.

At Step 625, the information of the present position of the subject vehicle, identified using the receiver 2, self-contained sensors, map matching, and the like, is stored in the external storage medium 16.

Subsequently, power supply to the receiver 2 and the navigation device 1 is turned off at Step 630.

By executing the above-mentioned program, the control circuit 18 performs the following operations, triggered by the ignition key for the vehicle being turned into the off or ACC position (Step 605): when high-accuracy position determination is feasible (Step 615), the control circuit 18 causes the receiver 2 to execute high-accuracy position determination (Step 620). Thereafter, the present position of the subject vehicle is stored in the external storage medium 16, and power supply is turned off. When the subject vehicle is started, that is, the key switch is turned into the on position next time, the present position information thus stored in the external storage medium 16 is used as the present position of the subject vehicle at that time. Therefore, when the vehicle is started, the positional relation of the subject vehicle can be displayed with accuracy.

Figure 16:
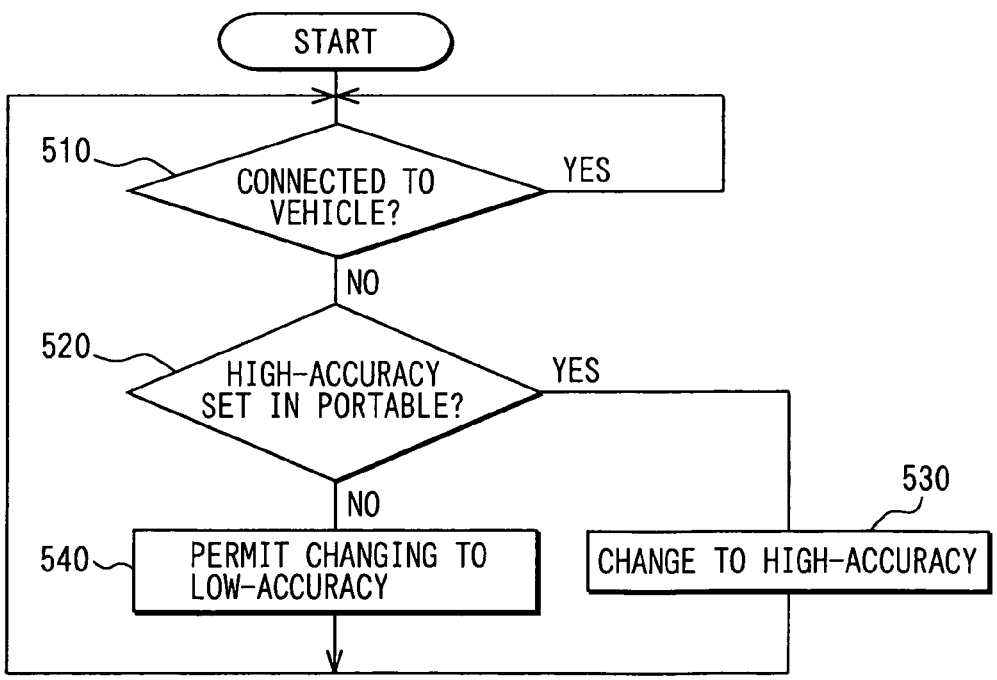
FIG. 16 is a flowchart of a program executed to control the position determination accuracy of the receiver for satellite navigation when the navigation device is removed from the vehicle.

Next, description will be given to a program executed by the CPU of the control circuit 18 when the navigation device 1 can be removed from the vehicle, with reference to FIG. 16. This program is executed to control the position determination accuracy of the receiver 2 when the navigation device is removed from the vehicle.

The execution of this program is started immediately after the navigation device 1 is started. First, it is determined at Step 510 whether the navigation device 1 is connected to the vehicle. This determination is made by determining whether power is being supplied from the battery (not shown) of the vehicle or whether power is being supplied from the battery (not shown) mounted in the navigation device 1 itself. When the navigation device 1 is mounted in the vehicle, the processing of Step 510 is repeated. When it is not mounted, the processing of Step 520 is subsequently performed.

At Step 520, it is determined whether the setting of position determination method for the navigation device 1 as disconnected from the vehicle (i.e. in portable mode) is high-accuracy position determination or not. That the setting of position determination method in portable mode is high-accuracy position determination means that the value of a portable mode flag ensured beforehand in a predetermined area in the external storage medium 16 is on. This flag is user-settable.

Specifically, this flag is so constituted that the value of the flag is switched between on and off when the user operates the operation switch group 17 for changing the flag setting. When the setting of position determination method in portable mode is high-accuracy position determination, the processing of Step 530 is subsequently performed. When it is not high-accuracy position determination, the processing of Step 540 is subsequently performed.

At Step 530, control is executed to change the position determination accuracy of the receiver 2 to high accuracy. Specifically, a measurement accuracy instruction to execute high-accuracy position determination is outputted to the receiver 2.

At Step 540, it is permitted to change the position determination accuracy of the receiver 2 to low accuracy. Specifically, a measurement accuracy instruction to execute low-accuracy position determination is outputted to the receiver 2.

By executing the above-mentioned program, the CPU of the control circuit 18 causes the receiver 2 to execute position determination with low accuracy (Step 540) after the navigation device 1 is judged not to be connected to the vehicle (Step 510). However, when the user has made setting to cause the receiver 2 to execute position determination with high accuracy (Step 520), the receiver 2 is caused to execute position determination with high accuracy (Step 530).

The above-mentioned map display program is constituted as mentioned above. Therefore, the present position is displayed based on the information of a position identified on a map with low accuracy and the information of a position computed by estimation navigation unless there is the user's explicit setting to execute position determination with high accuracy. As a result, the power consumption is reduced.

As mentioned above, the receiver 2 carries out position determination with high accuracy or low accuracy based on signals from satellites for satellite navigation. As the result of the above-mentioned operation of the navigation device 1, the following occurs: it is determined with which accuracy the receiver 2 should be caused to execute position determination. The receiver 2 is caused to execute position determination with the accuracy based on this determination. At the same time, decoding for position determination with the other accuracy of the multiple accuracies, different from the determination-based accuracy, is prevented from being executed. As mentioned above, decoding for position determination with the other accuracy, different from the accuracy with which position determination is determined to be executed, is prohibited. Therefore, the power consumption in position determination can be suppressed.

Further, power supply to parts for executing position determination with the other accuracy, different from the determination-based accuracy, is interrupted. Thus, the power consumption can be further suppressed.

In the above-mentioned embodiment, the control circuit 18 executes the programs illustrated in FIG. 5, FIG. 9, FIG. 11, FIG. 15, FIG. 16, and FIG. 17, and thereby functions as a determining unit.

Further, the control circuit 18 executes the control program 181, and thereby functions as a controlling unit.

(Others)

In addition to the above-mentioned embodiment, the CPU of the control circuit 18 may be constituted so as to operate as follows: when the display unit 20 does not display the position of the subject vehicle on a map, the CPU determines to cause the receiver 2 to execute position determination with an accuracy that is not higher than a predetermined accuracy (i.e. low accuracy) of multiple accuracies (i.e. high accuracy and low accuracy). Based on this determination, the CPU outputs a measurement accuracy instruction to execute low-accuracy position determination to the receiver 2.

In the above-mentioned embodiment, the navigation device 1 controls the receiver 2 so as to execute position determination with high accuracy to generate the position information of a new road based on the following fact: the subject vehicle is not running on a road whose information is contained in the map information in the external storage medium 16. Instead, this control may be executed based on the following fact: the subject vehicle is not running on a road whose information is not contained in the map information in any medium other than the external storage medium 16. One example of such storage media is a storage medium that is external to the vehicle and is held in a map information management center that distributes map information through wide-area networks such as the Internet. That is, map information can be stored in any storage medium.

The above-mentioned embodiment may be constituted so that the following will occur: the receiver 2 is caused to acquire or track satellites required only for high-accuracy position determination. Thus, even when the receiver 2 is caused to execute position determination with low accuracy, it can output high-accuracy position information immediately after the setting is changed to high-accuracy position determination. Even in this case, however, signals from satellites required only for the high-accuracy position determination are not subjected to de-spreading decoding at the CPU 24.

It will be obvious to those skilled in the art that various changes may be made in the above-described embodiments of the present invention. However, the scope of the present invention should be determined by the following claims.

What is claimed is:

1. A satellite navigation controller tat controls a receiver for satellite navigation, wherein the receiver is able to receive signals having individual chip rates from satellites to thereby execute position determination with at least two different accuracies including a higher accuracy and a lower accuracy, the chip rate being a speed of spreading code for subjecting the signal to spreading modulation and de-spreading demodulation, the satellite navigation controller comprising:

a chip rate switching unit configured to switch between at least two chip rates including a higher chip rate and a lower chip rate, each chip rate being corresponded to by one of the at least two accuracies, the higher chip rate corresponding to the higher accuracy while needing a processing load and power consumption higher than the lower chip rate;

a determining unit configured to determine a first accuracy, which is one of the at least two accuracies, the first accuracy at which the receiver should be caused to execute position determination; and a controlling unit configured to cause the chip rate switching unit to switch to a first chip rate of the at least two chip rates, the first chip rate being corresponded to by the first accuracy, to thereby allow the receiver to execute position determination with the first accuracy and prohibit decoding signals from the satellites for executing position determination with a second accuracy, which is different than the first accuracy of the at least two accuracies.

2. The satellite navigation controller of claim 1, wherein the controlling unit is further configured to interrupt power supply to parts which receive and decode signals from the satellites for executing position determination at the second accuracy to thereby prohibit the receiver from executing position determination with the second accuracy.

3. The satellite navigation controller of claim 1,
wherein the satellite navigation controller is mounted in a vehicle when used, and
wherein the determining unit is further configured to calibrate a position of the vehicle computed by a self-contained navigation, for determining the first accuracy of the at least two accuracies at which the receiver should be caused to execute position determination, wherein the first accuracy determined is not lower than a predetermined accuracy.

4. The satellite navigation controller of claim 1,
wherein the satellite navigation controller is mounted in a vehicle when used, and
wherein the determining unit is further configured for, based on a fact that the vehicle is in a position close to an intersection at which a road is branched at a narrow angle, for displaying a positional relation between the road and the vehicle, determining the first accuracy with which the receiver should be caused to execute position determination, wherein the first accuracy determined is not lower than a predetermined accuracy.

5. The satellite navigation controller of claim 1,
wherein the satellite navigation controller is mounted in a vehicle when used, and
wherein the determining unit is further configured for, based on a fact that the vehicle is running on a narrow street, for displaying a positional relation between the narrow street and the vehicle, determining the first accuracy with which the receiver should be caused to execute position determination, wherein the first accuracy determined is not lower than a predetermined accuracy.

6. The satellite navigation controller of claim 1,
wherein the satellite navigation controller is mounted in a vehicle when used, and
wherein the determining unit is further configured for, based on a fact that the vehicle is running on any adjacent parallel road of a plurality of adjacent parallel roads, for displaying a positional relation between the any adjacent parallel road and the vehicle, determining the first accuracy with which the receiver should be caused to execute position determination, wherein the first accuracy determined is not lower than a predetermined accuracy.

7. The satellite navigation controller of claim 1,
wherein the satellite navigation control let is mounted in a vehicle when used, and
wherein the determining unit is further configured for, based on a fact that a key switch for the vehicle is in one of an ACC position and an off position, determining the higher accuracy as the first accuracy with which the receiver should be caused to execute position determination.

8. The satellite navigation controller of claim 1,
wherein, the satellite navigation controller is mounted in a vehicle when used, and
wherein, the determining unit is further configured so that when it determines the first accuracy with which the receiver should be caused to execute position determination, wherein the first accuracy determined is not lower than a predetermined accuracy, a maximum extraction range for map matching is narrowed.

9. The satellite navigation controller of claim 1, further comprising:
a display unit configured to display a position of a vehicle where the satellite navigation controller is mounted,
wherein the determining unit is further configured for, based on a fact that the display unit does not display the position of the vehicle on a map, determining the lower accuracy as the first accuracy with which the receiver should be caused to execute position determination.

10. The satellite navigation controller of claim 1, mounted in a vehicle when used and further comprising:
a display unit configured to display a position of the vehicle on a map; and
a detecting unit configured to detect whether the satellite navigation controller is connected to equipment in the vehicle or not,
wherein the determining unit is further configured for, based on a fact that the detecting unit detects that the satellite navigation controller is not connected, for causing the display unit to display the position of the vehicle on a map, determining the lower accuracy as the first accuracy with which the receiver should be caused to execute position determination when the vehicle stop.

11. The satellite navigation controller of claim 1,
wherein the satellite navigation control is mounted in a vehicle when used,
wherein the determining unit is further configured for, based on a fact that the vehicle approaches a preset destination within a predetermined distance, for computing a positional relation between the destination and the vehicle, determining the first accuracy with which the receiver should be caused to execute position wherein the first accuracy determined is not lower than a predetermined accuracy.

12. The satellite navigation controller of claim 1,
wherein the satellite navigation controller is mounted in a vehicle when used,
wherein the determining unit is further configured for, based on a fact that the vehicle is running on a certain road that is not described in map information, for generating position information of the certain road, determining the first accuracy with which the receiver should be caused to execute position determination, wherein the first accuracy determined is not lower than a predetermined accuracy.

13. The satellite navigation controller of claim 1,
wherein the satellite navigation controller is mounted in a vehicle when used,
wherein the determining unit is further configured for, based on a fact that the vehicle is running on a given road described on a map based on position determination with an accuracy that is not higher than a predetermined accuracy, for generating position information of the given road, determining the first accuracy with which the receiver is caused to execute position determination, wherein the first accuracy determined is not lower than the predetermined accuracy.

14. The satellite navigation controller of claim 1, wherein the higher accuracy corresponds to a measurement error of not more than 10 centimeters, wherein the lower accuracy corresponds to a measurement error of not less than 10 meters.

15. The satellite navigation controller of claim 1, wherein the higher accuracy is obtained using real time kinematic positioning.

16. A positioning system used in a navigation device for a vehicle, the system comprising:
a receiver for satellite navigation to receive signals having individual chip rates from satellites to thereby execute position determination, the chip rate being a speed of spreading code for subjecting the signal to spreading modulation and de-spreading demodulation, the receiver including:

a chip rate switching unit configured to facilitate switching at least two chip rates therebetween, each chip rate being corresponded to by one of the at least two accuracies;

a first positioning unit configured to facilitate determining a position of the vehicle with a first chip rate corresponded to by a first accuracy having a first measurement error, the second chip rate needing a processing load and power consumption higher than the first chip rate; and a second positioning unit configured to facilitate determining a position of the vehicle with a second chip rate corresponded to by a second accuracy having a second measurement error lower than the first measurement error; and a satellite navigation controller configured to control the receiver based on signals from satellites for satellite navigation, the satellite navigation controller including:

a chip rate switching unit configured to switch the first chip rate and the second chip rate therebetween;

a determining unit configured to determine one of the two accuracies for executing position determination; and a controlling unit configured to cause the chip rate switching unit to switch to one of the two chip rates corresponded to by the one of the two accuracies determined, to thereby allow the receiver to execute position determination with the one of the two accuracies determined and prohibit decoding signals from the satellites for executing position determination with, of the two accuracies, another accuracy different from the one of the two accuracies determined.

17. The positioning system of claim 16, wherein the first measurement error is not less than 10 meters, wherein the second measurement error is not more than 10 centimeters.

* * * * *